A. SANFORD.
SEED PLANTER.
APPLICATION FILED MAY 24, 1915.
1,216,171.
Patented Feb. 13, 1917.
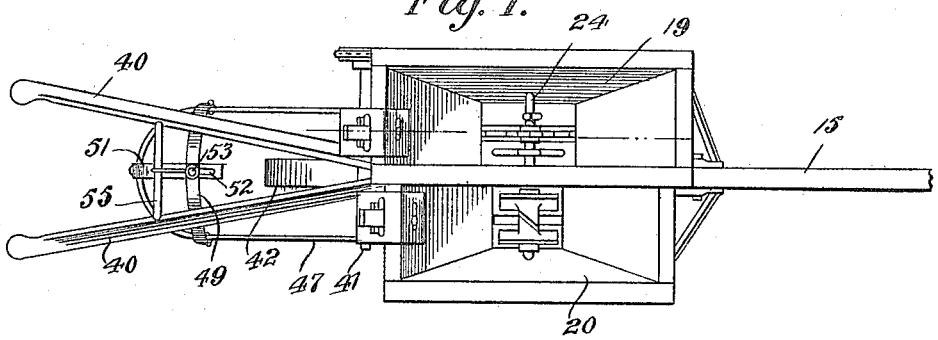
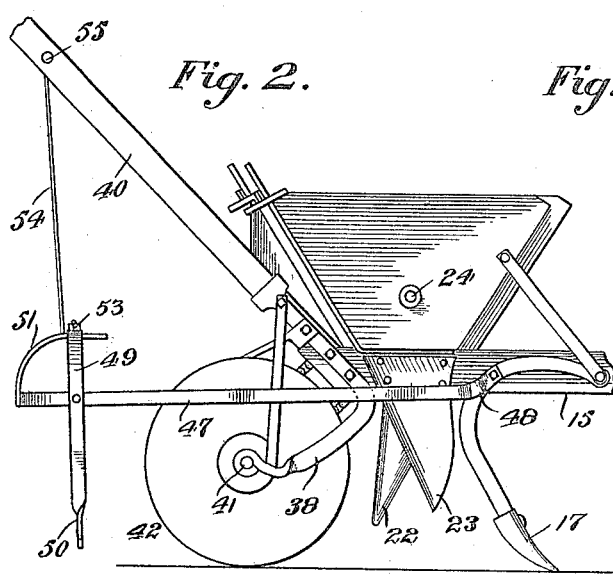
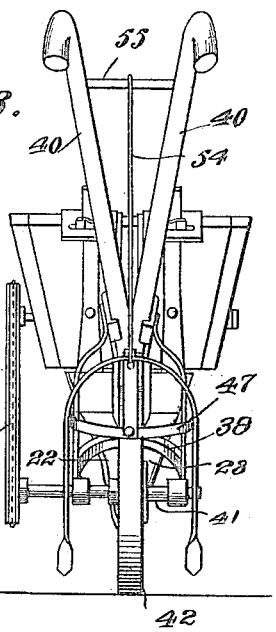
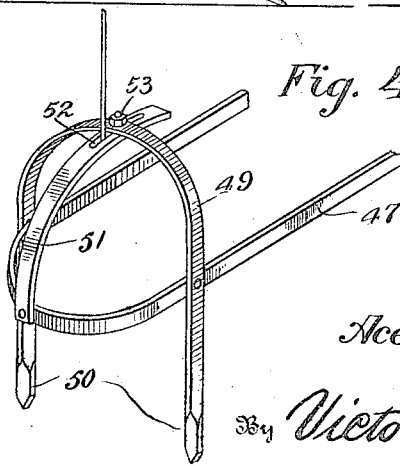
Inventor
Ace Sanford.
By Victor J. Evans
Attorney
Witness

UNITED STATES PATENT OFFICE.

ACE SANFORD, OF DADEVILLE, ALABAMA.

SEED-PLANTER.

1,216,171.  Specification of Letters Patent.  Patented Feb. 13, 1917.

Application filed May 24, 1915. Serial No. 30,179.

*To all whom it may concern:*

Be it known that I, ACE SANFORD, a citizen of the United States, residing at Dadeville, in the county of Tallapoosa and State of Alabama, have invented new and useful Improvements in Seed-Planters, of which the following is a specification.

This invention relates to seed planters and fertilizer distributers of that class or type in which a beam that is equipped with a standard having a plow or furrow opener is utilized to support the hopper or hoppers containing the material to be deposited, a ground engaging wheel being also provided for the purpose of driving the moving parts of the device.

The present invention has for its object to simplify and improve the general construction and the manner of assembling the parts of the device to form an inexpensive and effective structure for the purposes intended.

A further object of the invention is to provide in a machine of the class described a covering device of simple and improved construction.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a top plan view of a device constructed in accordance with the invention.

Fig. 2 is a side elevation of the same.

Fig. 3 is a rear elevation.

Fig. 4 is a perspective detail view of the covering device.

Corresponding parts in the several figures are denoted by like characters of reference.

The beam 15 may be an ordinary plow beam carrying a standard on which a furrow opener 17 is mounted in the usual manner. Mounted on top of the beam 15 near the rear end thereof is a hopper having a seed compartment 19 and a fertilizer compartment 20. The seed and fertilizer compartments are provided with ducts 22, 23 discharging, respectively, in a rearward and in a forward direction, the fertilizing material being thereby deposited in the furrow formed by the furrow opener 17 previous to the deposit of seed in said furrow. Extending transversely through the hopper compartments is a shaft 24 carrying agitating devices, and the bottom portions of the hopper compartments are provided with means such as slides for the purpose of regulating the quantity of material discharged.

Secured on the opposite side faces of the beam 15 adjacent to the rear end of the latter are brackets 38 with which the handles 40 are connected, said brackets supporting also an axle 41 carrying the ground wheel 42. From the axle 41 motion is transmitted by a chain 44 to the shaft 24 which will thus be driven when the machine is in operation.

A covering device is provided, the same comprising an elongated yoke 47, the limbs of which are provided with inturned arms or brackets 48 which are pivoted on opposite sides of the beam. Connected pivotally with the yoke 47 near the bridge portion thereof is a second yoke 49, the limbs of which normally extend downwardly and terminate in the coverers 50. Connected with the bridge portion of the yoke 47 is an arcuate arm 51 having a slot 52 for the passage of a fastening member, such as a bolt 53, whereby the yoke 49 is adjustably connected with the arcuate arm 51. It will be seen that by this construction the yoke 49 may be readily tilted to various positions so as to present the coverers at various inclinations with respect to the ground. The covering device is connected by means of a flexible element, such as a cord 54, with the ring 55 that connects the handles and with which the flexible element may be adjustably connected by the formation of an ordinary knot so as to support the covering device at various elevations.

When the machine is drawn over the ground the plow 17 will open a furrow in which the fertilizing material and seed will be successively deposited, the same being compacted by the action of the ground engaging wheel which travels in the furrow and which also tends to pack a portion of the soil upon the seed. The covering device following in rear will complete the covering operation, and it is obvious that said covering device may be adjusted in the manner described so as to perform its function in the most satisfactory manner. The general construction is simple and inexpensive, and the machine is light, compact and easily operated with good results.

Having thus described the invention what is claimed as new, is:—

In a machine of the class described, including a beam, a furrow opener and seed depositing means, a covering device comprising an elongated yoke, the limbs of which have inturned arms pivoted on opposite side faces of the beam, a second yoke pivotally connected with the first named yoke and having limbs terminating in coverers, an arcuate arm connected with the bridge piece of the first named yoke, and means for adjustably connecting the second yoke with said arcuate arm.

In testimony whereof I affix my signature in presence of two witnesses.

ACE SANFORD.

Witnesses:
Mrs. V. S. CARLETON,
Mrs. M. C. ROBINSON.

Copies of this patent may be obtained for five cents each, by addressing the "Commissioner of Patents, Washington, D. C."